3,173,977
PRODUCTION OF SHAPED OBJECTS FROM HIGH-MOLECULAR POLYOLEFINS
Paul Esselmann, Troisdorf, Hermann Fischer, Troisdorf-Oberlar, Michael Wienand, Siegburg, and Adolf Ristau, Troisdorf, Germany, assignors to Dynamit Nobel Aktiengesellschaft, a corporation of Germany
No Drawing. Filed Nov. 15, 1955, Ser. No. 547,023
Claims priority, application Germany, Nov. 19, 1954, D 19,149
5 Claims. (Cl. 264—210)

This invention relates to new and useful improvements in the preparation of shaped objects, such as filaments, bands, or films from high-molecular weight polyolefins.

The production of filaments, bands, and films of high-polymeric plastics, is, of course, well known. Thus, for example, filaments and films have been produced from polyamides, polyvinyl chloride, polyacrylonitrile, and similar polymerization products by dissolving the polymer in solvents, followed by spinning, or else by spinning directly from the melt.

In connection with the formation of the shaped objects by spinning directly from the melt, the same have certain characteristics, which might be considered analogous to those of certain metals. Thus, in connection, for example, with shaped objects, formed by spinning polyamides directly from the melt there are present amorphous and crystal domains. In order to impart to the shaped article the necessary strength, the same must be subject to a cold drawing operation which effects molecular alignment of the crystal domains and in certain cases even causes additional crystallization. The cold drawing is generally effective at room temperature by stretching the object, such as the filament or film by about 4 to 5 times its original length. Without this cold-storing operation, it was not possible to obtain filaments or films which were usable.

One object of this invention is the production of usable shaped objects, such as filaments, bands, or films without the necessity of cold drawing. These, and still further objects, will become apparent from the following description:

The starting material in accordance with the invention is a high-molecular polyolefin, such as a polyethylene, polypropylene, poly-higher-olefins, or copolymers of these olefins, which have been prepared by the newer polymerization processes, which operate at relatively low pressures, such as normal pressure, slightly elevated pressures, or even sub-atmospheric pressures in contrast to the previously used polymerization methods, which operated at relatively high pressures. Particularly well suited starting materials in the process of the invention are polyethyethylenes having molecular weights of from 40,000 to more than 1,000,000, which have been prepared by the newer low-pressure polymerization processes.

In accordance with the invention, the starting polyolefin prepared by the low-pressure polymerization process is extruded from its melt into the form of a shaped object, such as a filament band or film, and thereafter stretched to at least six times its initial length, as, for example, six to twenty times its initial length at a temperature below the flow point of the polymer to about 90° C. below the flow point.

The stretching is generally effected, for example, at temperatures between about 90 and 110° C., and may be effected in a swelling bath, such as hot water, glycerine, or some other medium. It is also possible to effect the stretching in the presence of a hot gas, such as hot air, at, for example, a temperature of about 100° C.

By effecting the stretching in this manner, at this precise point, the macro-molecules of the polyolefin become fixed, forming a strong usable structure having excellent physical properties. The objects will have an excellent strength and will not be excessively brittle.

The extruding of the objects from the melt may be effected in the conventional manner, as, for example, by forcing the melt through nozzles or spinnerettes under high pressure at or above its flow temperature, such as spinning.

The stretching in accordance with the invention may be effected in any conventional drawing means, as, for example, drawing rollers or the like.

The following examples are given to illustrate the invention and not to limit the same:

*Example 1*

A polyethylene having a molecular weight of 50,000 produced by the low-pressure process is forced in molten state through a metal spinnerette having a plurality of holes of 0.25 mm. diameter and the filaments formed are withdrawn by means of heated rolls at a speed of about 40 meters per minute. Thereupon the filaments are stretched 12 times during their passage through a hot water bath of 95° C. by a second pair of rolls, cooled, and wound onto a bobbin. Instead of hot water, glycerine or some other medium may also be used. If the stretching is increased beyond 10 times, there is obtained a filament having a lower elongation. The filaments obtained in all cases have strengths of 3,000 to 4,000 kilograms per square centimeter.

*Example 2*

Example 1 is repeated with the use of a polymerization product having a molecular weight of 500,000. The temperature for the melting must be increased to 340° C. The stretching is carried out in glycerine bath somewhat above 100° C.

*Example 3*

Example 1 is repeated, using, instead of the hot-water bath, hot air and other hot gases at a temperature of about 100° C.

Other polyolefins, including copolymers which have a high-molecular weight and have been produced by the low-pressure method can also be shaped in the manner described. In connection with the production of sheets, there are advisedly used annular nozzles, in which connection the plastic sprayed out of the annular nozzle is oriented by blowing up and solidified with hot inner air while simultaneously warming with outer air.

While the invention has been described in detail with reference to certain specific embodiments, various changes and modifications will become apparent to the artisan which fall within the spirit of the invention and the scope of the appended claims.

We claim:
1. In the production of objects of low-pressure polymerization produced polyolefins, having a molecular weight of at least 40,000, by extrusion at least at their flow temperature, the improvement which comprises drawing the extruded polyolefin to at least six times its original length at a temperature within the range of from below said flow temperature to 90° below said flow temperature but not below 90° C.

2. The improvement in accordance with claim 1 in which said polyolefin is polyethylene.

3. The improvement in accordance with claim 1 in which said extruded polyolefin is in the form of a filament.

4. The improvement in accordance with claim 1 in which said extruded polyolefin is in the form of a polyethylene filament and in which said filament is drawn to from 6 to 20 times its initial length.

5. The improvement in accordance with claim 1 in which said extruded polyolefin is drawn at a temperature between about 90 and 110° C.

References Cited by the Examiner

UNITED STATES PATENTS

| | | | |
|---|---|---|---|
| 2,210,774 | 8/40 | Perrin | 18—54 |
| 2,367,173 | 1/45 | Martin. | |
| 2,369,191 | 2/45 | Thurmond | 18—54 |
| 2,545,300 | 3/51 | Nixon | 18—14 |
| 2,762,791 | 9/56 | Pease | 18—54 |
| 2,763,029 | 9/56 | Tulloss. | |

FOREIGN PATENTS

| | | |
|---|---|---|
| 502,597 | 5/54 | Canada. |
| 510,145 | 2/55 | Canada. |

WILLIAM J. STEPHENSON, *Primary Examiner.*

ALEXANDER H. BRODMERKEL, MICHAEL V. BRINDISI, *Examiners.*